United States Patent [19]

Mills

[11] Patent Number: 5,040,256
[45] Date of Patent: Aug. 20, 1991

[54] COMBINATION TAPE MEASURER AND SHARPENER

[76] Inventor: Norman T. Mills, 61 Harrison Ave., Glens Falls, N.Y. 12801

[21] Appl. No.: 548,594

[22] Filed: Jul. 5, 1990

[51] Int. Cl.$^5$ .............................................. B25F 1/00
[52] U.S. Cl. ........................................ 7/164; 7/160;
7/163; 7/170; 33/760; 51/214; 51/181 R;
76/86; 30/138; 30/451
[58] Field of Search ................... 7/160, 164, 119, 120,
7/163, 170; 33/760, 761; 51/181, 205 WG, 214;
76/86; 30/452, 138, 123, 451

[56] References Cited

U.S. PATENT DOCUMENTS

| 752,339 | 2/1904 | Gutstein | 7/135 |
| 2,767,530 | 10/1956 | Paldanius | 30/138 |
| 3,809,137 | 5/1974 | Dombroski | 7/160 |
| 4,428,515 | 1/1984 | Mayer | 30/138 |
| 4,744,150 | 5/1988 | Horvath | 33/760 |
| 4,766,673 | 8/1988 | Bolson | 33/760 |
| 4,783,867 | 11/1988 | Tsao | 7/119 |

FOREIGN PATENT DOCUMENTS

| 725934 | 1/1966 | Canada | 7/160 |

*Primary Examiner*—Roscoe V. Parker
*Attorney, Agent, or Firm*—Richard C. Litman

[57] ABSTRACT

A combination tape measurer, pencil sharpener and knife blade sharpener is provided. The pencil and knife blade sharpeners are provided on a separate insert that is fitted onto the tape measurer. This allows each component to be used without interfering with the others. A conventional retractable tape measurer can be modified to produce the resultant combination tool.

7 Claims, 1 Drawing Sheet

COMBINATION TAPE MEASURER AND SHARPENER

BACKGROUND OF THE INVENTION

1. Field of the Invention

The present invention relates to tools used by workmen on a job site, such as for carpenters, masons, construction workers, and especially carpet installers. People involved in any sort of building activity are usually examining blueprints, material lists, instructions and the like. Corrections and additions to these items are usually done with a pencil, which will go dull quickly in any typical environment of this sort. The same thing can be said for utility knives and jack knives, which are used frequently by people in these professions to cut string, mats and other assorted materials associated with their work. It would be of the utmost convenience to have a tool handy that can sharpen these various implements without the workman having to search for or carry around with him separate tools for each task.

2. Description of the Prior Art

U.S. Pat. No. 4,428,515 issued to Mayer discloses a knife blade sharpener that is integrally mounted onto the scabbard of a knife. The sharpener is of the slot variety in which the knife blade is drawn through the slot to sharpen it. This device provides for no other functions besides holding a knife.

U.S. Pat. No. 4,783,867 issued to Tsao describes a multifunction tool which includes a retractable measuring tape, a pencil sharpener, a blade and other stationery tool elements that are frequently used for office work purposes. This tool is arranged in the manner similar to that of a Swiss Army knife. This tool is not merely a modified conventional tool, but a completely new construct. In this regard, it is something that would be difficult to construct and complex to use.

U.S. Pat. No. 752,339 issued to Gutstein discloses a pair of shears having a tape measurer and a pencil sharpener attached thereto. This tool would be clumsy to use as the individual components are not well packaged and integrated together.

U.S. Pat. No. 3,809,137 issued to Dombrowski describes a tape measurer having an integral pencil sharpener. It does not include a blade sharpener. Putting a blade sharpener with this particular tool would be difficult to do as can be seen from the drawings, as the sharpener is inserted into the center of the tape roll. Additionally, the tape roll here could not be retractable because the pencil sharpener is disposed where the coiled spring would be. This takes away from the usefulness of the device.

SUMMARY OF THE INVENTION

The applicant now presents a new tool that combines a retractable tape measurer with an insert containing a pencil sharpener and a slotted knife blade sharpener. The pencil and knife blade sharpeners are mounted on an insert that is mountable to the tape measurer. The sharpeners can be separately removed to allow for replacement when the cutting edges on the sharpening blades dull. The placement of each component allows for easy access to each, the tape measurer can be utilized without interfering with the blade and pencil sharpeners. The sharpeners are mounted flush with the surface of the tape measurer so that the measurer will not catch on clothing.

Accordingly, it is one object of the present invention to provide a combination tool that includes in one unit a retractable tape measurer, a pencil sharpener and a knife blade sharpener.

It is an object of the present invention to provide a combination tape measurer, pencil and knife blade sharpener that has separately mounted section for the pencil and blade sharpeners.

It is another object of the present invention to provide a combination tape measurer, pencil and knife blade sharpener that has a single removable insert for the pencil and knife blade sharpeners.

It is an additional object of the present invention to provide a combination tape measurer, pencil and knife blade sharpener that makes use of a conventionally available tape measurer.

It is also an object of the present invention to provide a combination tape measurer, pencil and knife blade sharpener that has a smooth exterior surface.

These and other objects of the present invention will become readily apparent upon further review of the following specification and drawings.

BRIEF DESCRIPTION OF THE DRAWINGS

Similar reference characters denote corresponding features consistently throughout the attached drawings.

A DETAILED DESCRIPTION OF THE PREFERRED EMBODIMENT

Figure 1:
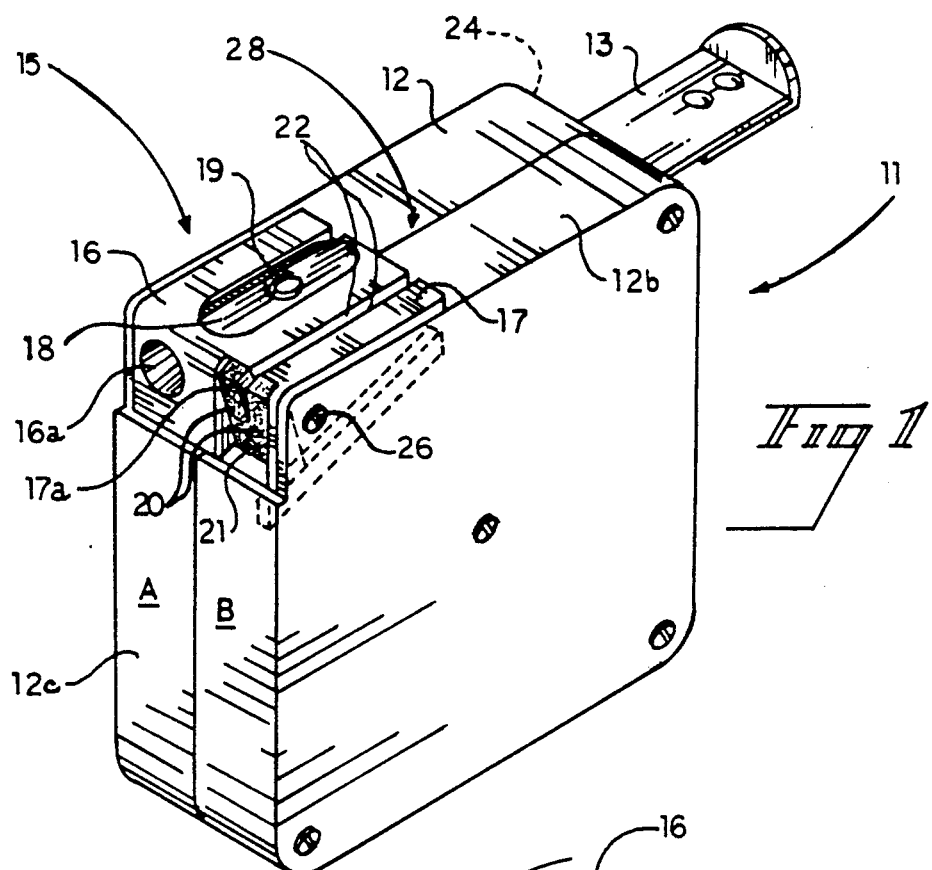
FIG. 1 is a perspective view of the present invention.

The present invention 10 of a combination tape measurer and pencil and knife sharpener is shown in perspective in FIG. 1. It comprises a conventional retractable tape measurer 11 that includes a two-part polygonal housing 12 joined along a seam 28, a length of rolled up measuring tape 13, a locking mechanism (not shown) and the usual clip (not shown) that allows the tool 10 to be attached to a workman's belt. Such devices are known and one in particular is manufactured by the STANLEY TOOL CO. Inside the housing 12 is a spring mechanism (not shown) that allows the tape 13 to be retracted when it is released from the extended position.

The modification is seen in the form of a unitary dual tool sharpening insert 15 that contains the pencil sharpener 16 and the knife blade sharpener 17. The pencil sharpener 16 includes a rearwardly facing conical entranceway 16a having a blade 18 disposed to one side. The blade is replaceable by means of removing it when the screw 19 is undone. The knife sharpener 17 includes two facing, angularly tilted sharpening elements 20 disposed to form a V-shaped opening 17a to allow a knife blade to be drawn between them. The knife sharpening elements 20 can be made of tungsten carbide, ceramic, natural stone, or any other material suitable for this purpose. The knife sharpening elements are also replaceable by means of an attachment screw 21. A V-shaped slot 22 formed forwardly of the sharpening elements 20 provides space for the knife blade to be drawn across the sharpening elements 20. The insert 15 sits upon a rack formed by a pair of inclined side rails 27 within the housing interior. The adjacent surfaces of the housing 12 and insert 15 are flush so that the measurer 11 has a smooth, non-catching surface.

Figure 2:
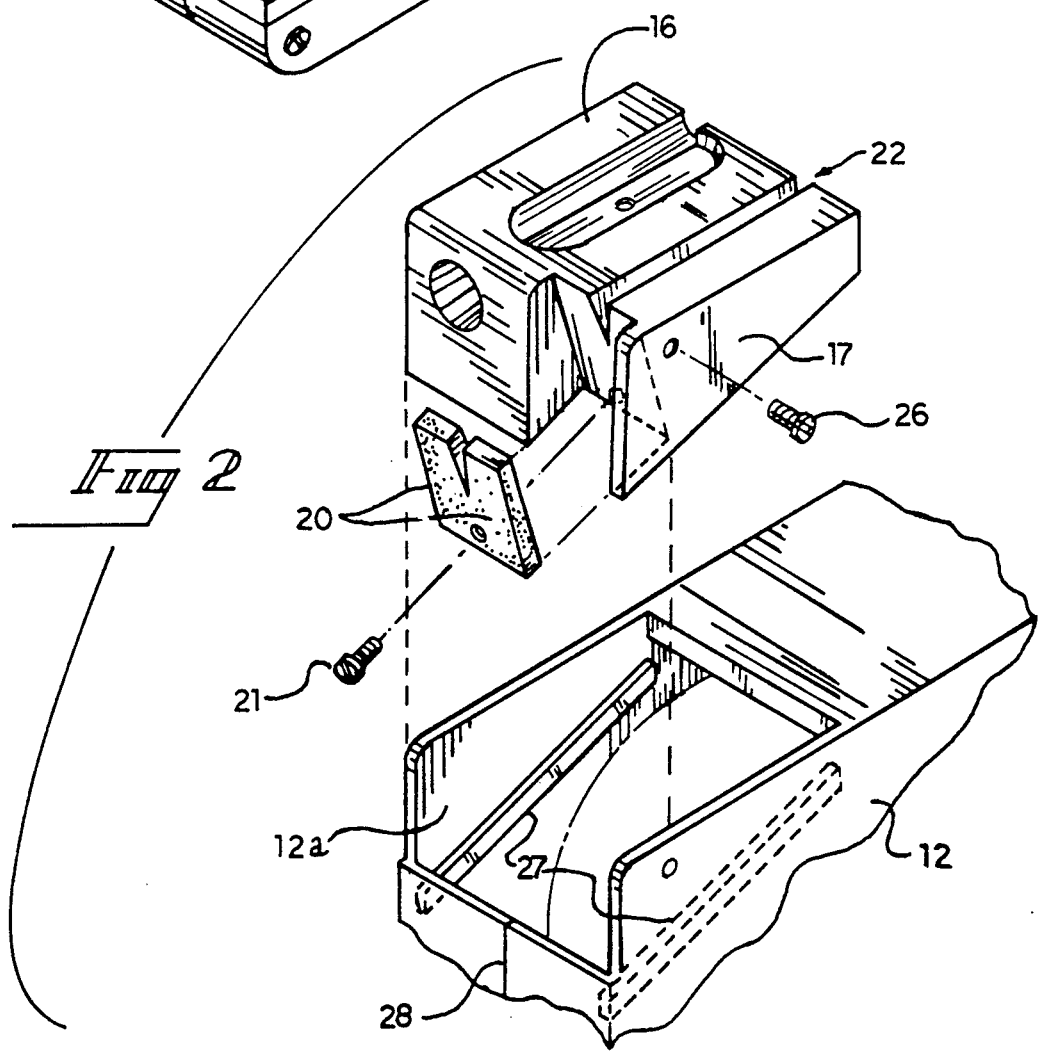
FIG. 2 is an exploded perspective view of the present invention showing the individual components of the tool.

The total insert 15 is disposed on the tape measurer 11 behind the opening 24 where the tape 13 enters the housing 12. A section of the tape measurer housing 12 is removed as shown in FIG. 2 to make room for the sharpening insert 15. It can then be emplaced by means of screws 30 or welding. The sharpening insert 15 does not interfere with the coiled tape 13 because the sharpening insert 15 is placed on the outer surface of the housing 12 adjacent two of its intersecting side walls 12b, 12c. Both the pencil sharpener 16 and the blade sharpener 17 have their entrances facing rearwardly or outwards so as not to interfere with the function of the tape measure 11. Having the pencil and knife sharpening insert 15 separate from the actual tape measurer 11 allows the tape measurer 11 to still maintain its retractable feature, unlike the prior art discussed above. A workman can now take with him a portable tape measurer and a pencil sharpener and a utility knife sharpener all within one unit.

It is to be understood that the present invention is not limited to the sole embodiment described above, but encompasses any and all embodiments within the scope of the following claims.

I claim:

1. A combination tape measurer, pencil sharpener and knife blade sharpener comprising;
    a polygonal housing having a plurality of side walls, a tape opening in one said side wall adjacent one intersection as formed by two of said plurality of side walls,
    a coiled spring-loaded retractable measuring tape disposed within said housing and extendible through said tape opening,
    a dual tool sharpening insert disposed within said housing adjacent another intersection as formed by said plurality of side walls,
    said insert including a substantially conical pencil-receiving opening therein and an adjacent pencil sharpening blade forming a pencil sharpening device with said pencil-receiving opening facing outwardly from the direction of one of said plurality of side walls,
    an abrasive knife blade sharpening element affixed to said insert and having a substantially V-shaped opening formed therein, said knife blade sharpening element forming a knife blade sharpening device with said knife blade sharpening element facing outwardly from the direction of said same one said plurality of side walls as said pencil-receiving opening faces outwardly from, and
    said pencil sharpening device disposed laterally adjacent said knife blade sharpening device.

2. A combination tape measurer, pencil sharpener and knife blade sharpener according to claim 1 wherein,
    said insert comprises a unitary block member, and
    fastener means removably attaching said pencil sharpening blade and said knife blade sharpening element to said unitary block member.

3. A combination tape measurer, pencil sharpener and knife blade sharpener according to claim 1 including,
    fastener means removably affixing said insert within said housing.

4. A combination tape measurer, pencil sharpener and knife blade sharpener according to claim 1 including,
    side rails within said housing adapted to support said insert.

5. A combination tape measurer, pencil sharpener and knife blade sharpener according to claim 1 wherein,
    said insert includes a longitudinal slot therein aligned with said knife blade sharpening element V-shaped opening, wherein
    said slot provides guide and alignment means for a knife blade as it is passed between said V-shaped opening in said knife blade sharpening element.

6. The combination tape measure, pencil sharpener and knife blade sharpener according to claim 1, wherein:
    said blade sharpening element is composed of tungsten carbide.

7. The combination tape measurer, pencil sharpener and knife blade sharpener according to claim 1, wherein:
    adjacent surfaces of said tape measurer housing side walls and said sharpening tool insert are coplanar, whereby a smooth exterior surface is provided.

* * * * *